United States Patent
You et al.

(10) Patent No.: US 12,269,372 B2
(45) Date of Patent: Apr. 8, 2025

(54) SEAT FOR VEHICLE WITH CUSHION TIP-UP AND DOWN FUNCTION

(71) Applicants: Hyundai Motor Company, Seoul (KR); Kia Corporation, Seoul (KR); Hyundai Transys Inc., Chungcheongnam-Do (KR)

(72) Inventors: Jung Sang You, Gyeonggi-Do (KR); Han Su Yoo, Gyeonggi-Do (KR); Guk Mu Park, Seoul (KR); Dong Woo Jeong, Gyeonggi-do (KR); Myung Hoe Kim, Seoul (KR); Eun Sue Kim, Gyeonggi-do (KR); Dae Hee Lee, Incheon (KR); Jae Hoon Cho, Gyeonggi-do (KR); Han Kyung Park, Gyeonggi-do (KR); Jae Sung Shin, Gyeonggi-do (KR); Hae Dong Kwak, Gyeonggi-do (KR); Gwon Hwa Bok, Gyeonggi-do (KR); Jun Sik Hwang, Gyeonggi-do (KR)

(73) Assignees: Hyundai Motor Company, Seoul (KR); Kia Corporation, Seoul (KR); Hyundai Transys Inc., Chungcheongnam-do (KR)

( * ) Notice: Subject to any disclaimer, the term of this patent is extended or adjusted under 35 U.S.C. 154(b) by 175 days.

(21) Appl. No.: 17/984,482

(22) Filed: Nov. 10, 2022

(65) Prior Publication Data
US 2023/0415615 A1    Dec. 28, 2023

(30) Foreign Application Priority Data
Jun. 23, 2022 (KR) .................... 10-2022-0077055

(51) Int. Cl.
 B60N 2/30    (2006.01)
 B60N 2/02    (2006.01)
 B60N 2/62    (2006.01)

(52) U.S. Cl.
 CPC ....... B60N 2/0284 (2013.01); B60N 2/02246 (2023.08); B60N 2/62 (2013.01);
(Continued)

(58) Field of Classification Search
 CPC ...... B60N 2/3038–3097; B60N 2/0284; B60N 2/02246; B60N 2/62
 See application file for complete search history.

(56) References Cited

U.S. PATENT DOCUMENTS 2,563,220 A * 8/1951 Doty ............... B60N 2/146
 297/344.21
7,086,696 B2 * 8/2006 Yudovich ........... B60N 2/3047
 297/335

(Continued)

FOREIGN PATENT DOCUMENTS

JP       2021-008225 A    1/2021
KR   10-2008-0017090 A    2/2008
KR        101194914 B1   10/2012

*Primary Examiner* — Syed A Islam
(74) *Attorney, Agent, or Firm* — Fox Rothschild LLP (57) ABSTRACT

A seat for a vehicle with a cushion tip-up and down function is provided. The seat is configured such that a cushion leg provided in a cushion is held, in a fitted manner, by a support spring of a support structure provided in a seat base, and when the cushion is rotated, the cushion leg is allowed to be folded and ejected by being automatically rotated, thereby improving the convenience of use.

19 Claims, 11 Drawing Sheets

(52) U.S. Cl.
CPC ............ *B60N 2/3047* (2013.01); *B60N 2/305* (2013.01); *B60N 2/3097* (2013.01)

(56) References Cited

U.S. PATENT DOCUMENTS

| | | |
|---|---|---|
| 9,302,600 B2 | 4/2016 | Zeimis, III et al. |
| 10,023,081 B2 * | 7/2018 | Akutsu ................ B60N 2/3047 |

* cited by examiner

SEAT FOR VEHICLE WITH CUSHION TIP-UP AND DOWN FUNCTION

CROSS REFERENCE TO RELATED APPLICATION

The present application claims under 35 U.S.C. § 119(a) the benefit of Korean Patent Application No. 10-2022-0077055, filed on Jun. 23, 2022, the entire contents of which is incorporated herein for all purposes by this reference.

BACKGROUND

Technical Field

The present disclosure relates to a seat for a vehicle with a cushion tip-up and down function. More particularly, the present disclosure relates to a seat for a vehicle with a cushion tip-up and down function, wherein a structure supporting a cushion leg is provided in a cushion assembly, so that the cushion leg is automatically rotated to be folded and ejected in tip-up and down operations of a cushion.

Background

A seat is provided in a vehicle for a passenger to sit thereon, and the seat for a vehicle includes a cushion supporting the lower body of the passenger, a back supporting the upper body, and a headrest supporting the head.

In general, a recreational vehicle (RV, SUV, MPV, etc.) is additionally equipped with an article storage function using the vehicle indoor space in addition to the passenger boarding function, and as a measure to increase the usability of indoor space, a walk-in seat function, full-flat function of second and third row seats, a folding and dive function of a rear seat, a cushion tip-up and down function, etc. are provided.

With the cushion tip-up and down function, it is possible to secure the indoor space usage and the movement path when the cushion is folded by rotating toward the back, and when the cushion rotating toward the back is ejected to protrude by rotating forward again, the passenger can sit on the cushion.

The seat for a vehicle with a cushion tip-up and down function includes a cushion leg supporting the cushion from a lower portion of the cushion when the passenger sits on the cushion. In the conventional structure, since a structure supporting the cushion leg is provided at a vehicle body, there is a problem in that a seat rail is not provided below the seat with a cushion tip-up and down function, and thus the seat is prevented from moving forward and rearward.

Furthermore, since the conventional structure is configured to prevent the cushion leg from automatically rotating when the cushion is rotated, after the cushion is rotated, the passenger should separately perform a manual rotation of the cushion leg, and thus the convenience of use is poor.

The foregoing is intended merely to aid in the understanding of the background of the present disclosure, and is not intended to mean that the present disclosure falls within the purview of the related art that is already known to those skilled in the art.

SUMMARY OF THE DISCLOSURE

The present disclosure is intended to provide a seat for a vehicle with a cushion tip-up and down function, the seat being configured such that a cushion leg provided in a cushion is supported by a support structure provided in a seat assembly. Accordingly, it is possible to provide a seat rail at a vehicle body below the seat, so that the seat can move forward and rearward using the seat rail, thereby improving the convenience of use.

Another objective of the present disclosure is intended to provide a seat for a vehicle with a cushion tip-up and down function, the seat being configured such that a cushion leg is automatically rotated to be folded and ejected while rotating a cushion. Accordingly, as there is no need for user action for rotation of the cushion leg, the convenience of use may be improved.

In order to achieve the above objectives, according to one aspect of the present disclosure, there is provided a seat for a vehicle with a cushion tip-up and down function, the seat including: a seat base; a cushion coupled to the seat base to be rotatable upward and downward; a cushion leg rotatably coupled to the cushion; and a support structure securely provided in the seat base and, in a state in which the cushion may protrude forward, the support structure supporting the cushion leg fitted into the support structure.

The seat base may be coupled to a seat rail and be configured to be movable forward and rearward along the seat rail.

The seat base may be provided to be divided into left and right parts; and left and right portions of the cushion may be coupled to the seat base to be rotatable on a cushion shaft.

The cushion leg may include: fixation parts securely coupled to left and right portions of the cushion, respectively; and a leg part of which opposite ends may be rotatably coupled to the fixation parts by leg shafts as a medium and an intermediate part may be fitted into the support structure.

The cushion leg may include: leg springs provided at the leg shafts, respectively, and each of which opposite ends may be supported by each of the fixation parts and the leg part, and configured to supply an elastic force to the leg part so that the leg part may be rotated forward on the leg shafts.

The seat may include: a cable bracket securely coupled to the cushion shaft connecting the seat base to the cushion; and a leg cable of which a first end may be connected to the cable bracket and a second end connected to the leg part, and when the cushion is rotated upward on the cushion shaft, the leg cable may pull the leg part so as to rotate the leg part.

In some embodiment, a protrusion may protrude from on the one end of the leg part, and the second end of the leg cable is securely coupled to the protrusion of the leg part.

In some embodiment, the leg cable is wrapped by an outer cover. The outer cover may be fitted into a fixation bracket welded to the cushion.

The cable bracket may be coupled to any one of two cushion shafts connecting the seat base to the cushion; and the second end of the leg cable may be connected to one end among the opposite ends of the leg part, the one end being located relatively far from the cable bracket.

The support structure may include: a support bracket located below the cushion and connecting the left and right parts of the seat base to each other; and a support spring fixed to the support bracket and into which a lower portion of the cushion leg may be fitted and held.

The support spring may have an arc-shaped section.

The support spring may be a plate spring into which the circular cushion leg may be inserted and be held by a spring force.

In a state in which the cushion protrudes forward, a lower end of the cushion leg may be held by the support spring in a fitted manner, and thus the cushion leg may support the cushion.

When a user lifts the cushion while the cushion leg is fitted into the support spring, as the cushion leg is separated from the support spring, the cushion may be rotated upward and stood up; when the cushion is rotated upward, the leg cable may be pulled; and as the leg cable is pulled, the cushion leg may be rotated to be folded in close contact with the cushion, and the leg springs may be compressed.

When the user rotates the stood cushion downward, the pulled leg cable may be relaxed, and thus the compressed leg springs may be restored; and the cushion leg may be rotated to protrude downward from the cushion by the spring force of the leg springs and then the lower end of the cushion leg may be held by the support spring in the fitted manner.

A seat for a vehicle with a cushion tip-up and down function may include: a cushion rotatably coupled to a seat base; and a cushion leg rotatably coupled to the cushion, wherein when the cushion protrudes forward, a lower end of the cushion leg may be held by a support spring provided in the seat base in a fitted manner below the cushion.

When the cushion protruding forward is rotated upward, the lower end of the cushion leg may be separated from the support spring, and as a leg cable connected to the cushion leg is pulled, the cushion leg may be automatically rotated to be in close contact with the cushion stood vertically, thereby maintaining a folded state.

When the vertically stood cushion is rotated downward, the cushion leg may be automatically rotated by a recovery force of the leg springs connected to the cushion leg to protrude downward from the cushion, and as the lower end of the cushion leg is held by the support spring in the fitted manner, the cushion may be supported by the cushion leg.

According to the present disclosure, the seat for a vehicle with a cushion tip-up and down function has the structure in which the cushion leg rotatably coupled to the cushion is fitted into and held by the support spring of the support structure provided in the seat base. Accordingly, as it is possible to provide the seat rail at a portion of the vehicle body below the seat, the forward and rearward movements of the seat using the seat rail 10 is possible, thereby improving the convenience of use.

Furthermore, the seat for a vehicle with a cushion tip-up and down function is configured such that a cushion leg is automatically rotated to be folded and ejected out while rotating a cushion. Accordingly, as there is no need for user action for rotation of the cushion leg, the convenience of use can be improved.

As discussed, the method and system suitably include use of a controller or processer.

In another embodiment, vehicles are provided that comprise an apparatus as disclosed herein.

DETAILED DESCRIPTION OF THE DISCLOSURE

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinbelow, a preferred embodiment described in the specification will be described in detail with reference to accompanying drawings, and regardless of the reference numerals, the same reference numerals will refer to the same or like parts, and redundant descriptions thereof will be omitted.

The suffixes "module and "part" for the components used in the following description are given or mixed in consideration of only the ease of writing the specification, and do not have distinct meanings or roles by themselves.

In the following description, if it is decided that the detailed description of known function or configuration related to the disclosure makes the subject matter of the disclosure unclear, the detailed description is omitted.

Furthermore, the accompanying drawings are only for understanding of the preferred embodiments of the present disclosure, and the technical ideas disclosed in the specification are not limited by the accompanying drawings, and those skilled in the art will appreciate that various modifications, additions and substitutions are possible, without departing from the scope and spirit of the disclosure as disclosed in the accompanying claims.

It will be understood that, although the terms first and/or second, etc. may be used herein to describe various elements, these elements should not be limited by these terms. These terms are only used to distinguish one element, from another element.

It is to be understood that when one element is referred to as being "connected to" or "coupled to" another element, it may be connected directly to or coupled directly to another element or be connected to or coupled to another element, having the other element intervening therebetween.

On the other hand, it is to be understood that when one element is referred to as being "connected directly to" or "coupled directly to" another element, it may be connected to or coupled to another element without the other element intervening therebetween.

Singular forms are intended to include plural forms unless the context clearly indicates otherwise.

It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

Furthermore, a unit or a control unit included in names such as a motor control unit (MCU), a hybrid control unit (HCU), etc. is only a widely used term for a controller that controls a specific function of a vehicle, and does not mean a generic function unit.

The controller may include a communication device communicating with other controllers or a sensor to control the function in charge, a memory storing an operation system or a logic command and input/output information, and at least one process performing determination, calculation, and decision necessary for controlling the function in charge.

Hereinbelow, a seat for a vehicle with a cushion tip-up and down function according to a preferred embodiment of the present disclosure will be described with reference to accompanying drawings.

According to the present disclosure, as shown in FIGS. 1 to 11, the seat for a vehicle with a cushion tip-up and down function may include: a seat base 100; a cushion 200 coupled to the seat base 100 to be rotatable upward and downward; a cushion leg 300 rotatably coupled to the cushion 200; a support structure 400 securely provided in the seat base 100, and in a state in which the cushion 200 protrudes forward, the support structure supporting the cushion leg 300 fitted thereinto; and a back 500 coupled to the seat base 100.

The seat base 100 may consists of a pair of brackets divided into left and right parts, and the cushion 200 and the back 500 may be coupled to the seat base 100.

The cushion 200 and the back 500 may include respective frames serving as the frame thereof.

The cushion 200 may be located between the left and right seat bases 100, and left and right portions of the cushion 200 may be rotatably coupled to the seat bases 100 on cushion shafts 210.

The cushion shafts 210 may be securely coupled to the seat bases 100, and each may have a structure that passes through the cushion 200 but is irrotational. Therefore, the cushion 200 is rotated on the cushion shafts 210.

The cushion leg 300 may include a fixation part and a rotation part, and the fixation part and the rotation part may be connected to each other.

The fixation part of the cushion leg 300 may be securely coupled to a front lower portion of the cushion 200, and the rotation part of the cushion leg 300 may be rotatably coupled to the fixation part and of which a lower end is coupled to the support structure 400 in a separable structure.

The support structure 400 to which the cushion leg 300 is coupled in a fitted manner may be structurally provided in the seat bases 100, and the lower end of the rotation part of the cushion leg 300 may be held by the support structure 400 in a fitted manner.

The embodiment according to the present disclosure may be a structure in which the support structure 400 holding the cushion leg 300 in the fitted manner is provided in the seat bases 100 corresponding to a seat assembly. Accordingly, as a seat rail 10 may be provided below the seat bases 100, the entire seat including the seat bases 100 may be moved forward and rearward along a seat rail 10, so that it is possible to improve the merchantability and the convenience thereof.

The seat rail 10 may consist of a combination of a fixation rail fixed to a vehicle body and a movement rail moved along the fixation rail. A lower portion of each of the seat bases 100 is coupled to the movement rail so that the entire seat including the seat bases 100 is movable forward and rearward along the seat rail 10.

The conventional structure may be a structure in which the support structure holding the cushion leg in the fitted manner is provided in the vehicle body, and the seat rail cannot be provided at a portion of the vehicle body below the seat, and thus there is a problem in that the seat having the cushion tip-up and down function cannot be moved forward and rearward.

However, in the embodiment according to the present disclosure, the support structure 400 may be provided in the seat bases 100 so as to provide the seat rail 10 below the seat bases 100. Accordingly, as the seat bases 100 and the seat rail 10 are connected to each other, the entire seat including the seat bases 100 may be moved forward and rearward along the seat rail 10, so that it is possible to improve the merchantability and the convenience as an advantage.

The cushion leg 300 may include fixation parts 310 securely coupled to left and right portions of the cushion 200, and a leg part 330 of which opposite ends may be rotatably coupled to the fixation parts 310 by leg shafts 320 as a medium and an intermediate portion is fitted into the support structure 400.

Each of the fixation parts 310 may serve as the fixation part of the cushion leg 300, and the leg part 330 may serve as the rotation part of the cushion leg 300.

The fixation parts 310 of the cushion leg 300 may be securely coupled to the front left and right portions of the cushion 200 by welding. The U-shaped leg part 330 of the cushion leg 300 is rotatably coupled, at the opposite ends thereof, to the fixation parts 310 by the leg shafts 320 as a medium.

The cushion leg 300 may include leg springs 340, and the leg springs 340 may be provided in the leg shafts 320, respectively, and of which opposite ends may be supported by the fixation parts 310 and the leg part 330, respectively.

Each of the leg springs 340 may be a torsion spring installed to be located inside both each of the fixation parts 310 and the leg part 330, and serve to provide an elastic force to the leg part 330 so that the leg part 330 is rotated forward on each of the leg shafts 320.

The seat according to the present disclosure may include a cable bracket 610 securely coupled to each of the cushion shafts 210 connecting the seat bases 100 to the cushion 200, and a leg cable 620 of which a first end is connected to the cable bracket 610 and a second end is connected to the leg part 330(*630->330) so as to pull and rotate the leg part 330 when the cushion 200 is rotated upward on the cushion shafts 210.

The cushion shafts 210 may penetrate through the left and right portions of the cushion 200, respectively, and an outward first end of each of the cushion shafts 210 may be coupled to each of the seat bases 100 to be irrotatably fixed, and the cam-shaped cable bracket 610 is securely coupled to a second end of the cushion shaft 210 protruding inward from the cushion 200 by welding.

Therefore, the cushion 200 may be rotated upward and downward on the cushion shafts 210, and when the cushion 200 is rotated, both each of the cushion shafts 210 and the cable bracket 610 are not rotated and maintain a fixed state.

The leg cable 620 may be wrapped by an outer cover 621, and the outer cover 621 may be fitted into a fixation bracket 630 welded to the cushion 200.

The cable bracket 610 may be coupled to any one of two cushion shafts 210 connecting the seat bases 100 to the cushion 200.

A first end of the leg cable 620 may be connected to the cable bracket 610, and the leg cable 620 may be extended forward, sideways, and rearward again along an outer frame of the cushion 200 and then may be connected to a first end of the leg part 330.

In other words, a second end of the leg cable 620 may be connected to one end of opposite ends of the leg part 330, the one end being located relatively far from the cable bracket 610. A protrusion 331 protrudes from on the one end of the leg part 330, and the second end of the leg cable 620 is securely coupled to the protrusion 331 of the leg part 330.

A reason that the second end of the leg cable 620 is not connected to a part of the leg part 330, the part being located relatively close to the cable bracket 610, but is extended long along the outer frame of the cushion 200 and then is connected to the protrusion 331 of the leg part 330, the protrusion 331 being located relatively far from the cable bracket 610, may be for the leg part 330 to be easily rotated on the leg shafts 320 by using a pulling force of the leg cable 620 when the cushion 200 is rotated upward.

The support structure 400 according to the present disclosure may include a support bracket 410 located below the cushion 200 and connecting the left and right seat bases 100 to each other, and a support spring 420 fixed to the support bracket 410 and hold a lower portion of the cushion leg 300 fitted thereinto.

The support bracket 410 may be arranged below the cushion 200 to be extended leftward and rightward and may be provided to connect, at left and right opposite ends thereof, the two seat bases 100 to each other.

The support spring 420 may be installed to an intermediate portion of the support bracket 410, and the lower end of the leg part 330 constituting the cushion leg 300 may be held by the support spring 420 in the fitted manner.

In other words, in a state in which the leg part 330 protrudes downward from the cushion 200, the lower end of the leg part 330 may be held by the support spring 420 in the fitted manner, and at this time, the cushion 200 may be supported by the cushion leg 300 so that a passenger can sit on the cushion 200.

The lower end of the leg part 330 fitted in the support spring 420 may be released and separated from the support spring 420 when the user rotates the cushion 200 upward.

The lower end of the leg part 330 of the cushion leg 300 fitted in the support spring 420 may have a circular section, and the support spring 420 may be shaped in a plate spring having an arc-shaped section, so that the circular leg part 330 is inserted thereinto and held by a spring force.

It is preferable that the arc-shaped support spring 420 may be provided with a structure that is open toward the upper rear side in consideration to a turning radius of the leg part 330 and coupling between the leg part 330 and the support spring 420.

As shown in FIGS. 1 to 4, when the cushion 200 protrudes forward, the leg part 330 of the cushion leg 300 may protrude by being rotated downward on the leg shafts 320. At this time, as the lower end of the leg part 330 is fitted into and held by the support spring 420 of the support bracket 410 provided in the seat base 100, the cushion leg 300 supports the cushion 200, and at this time, the passenger can sit on the cushion 200.

Figure 1:
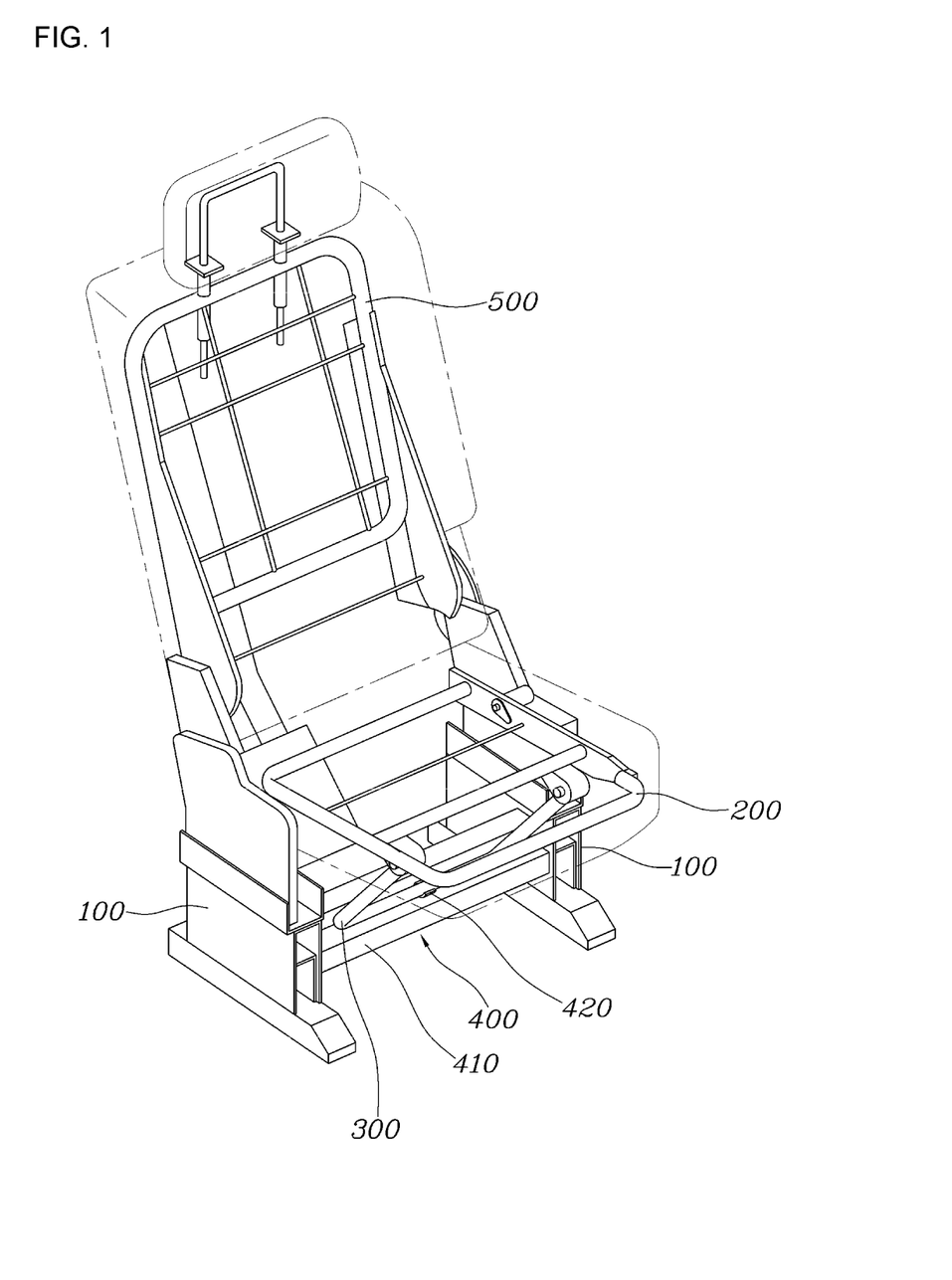
FIG. 1 is a view showing a seat for a vehicle with a cushion tip-up and down function according to the present disclosure, wherein a cushion leg is securely fitted around the support spring.
Figure 2:
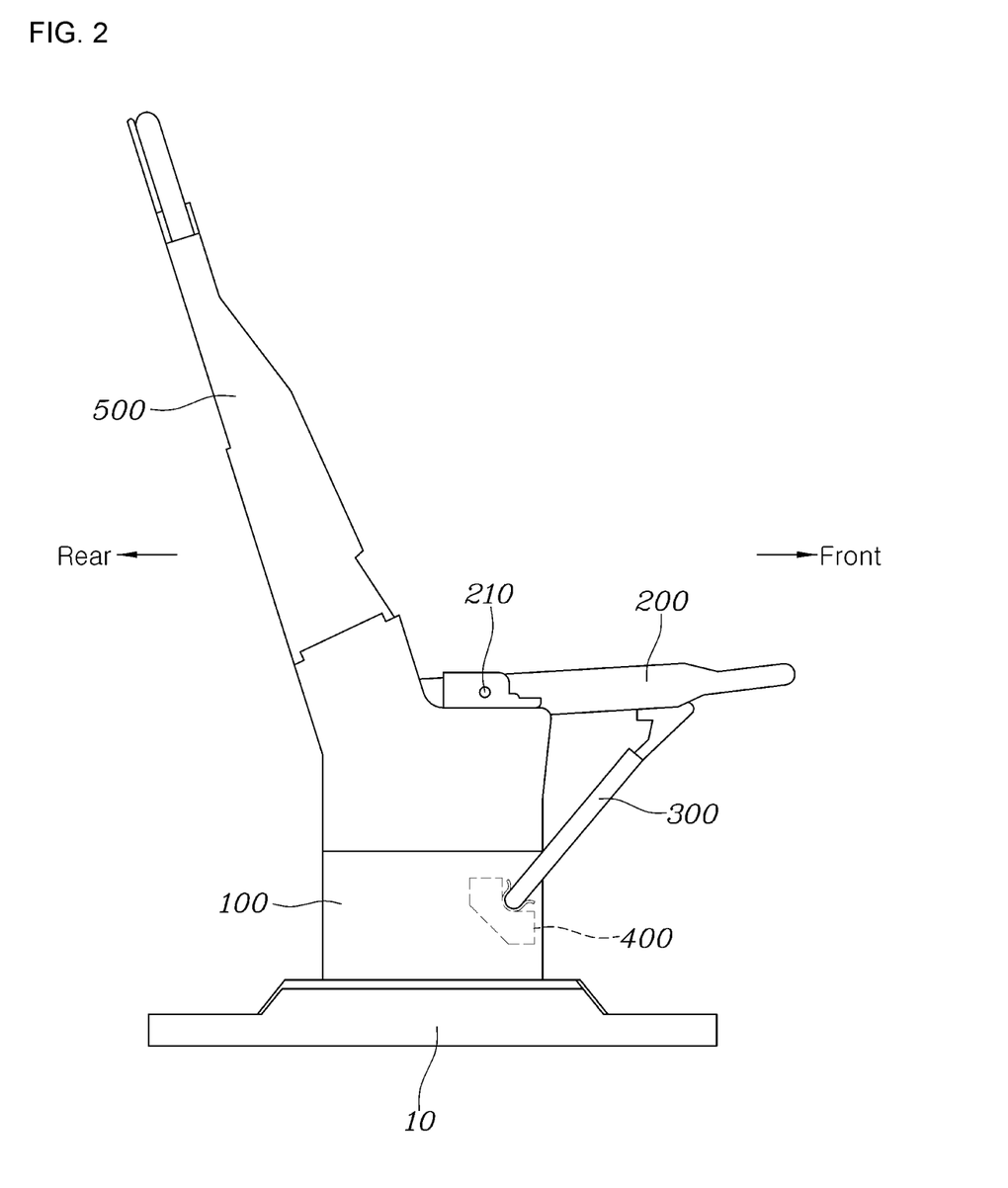
FIG. 2 is a side view of FIG. 1.
Figure 3:
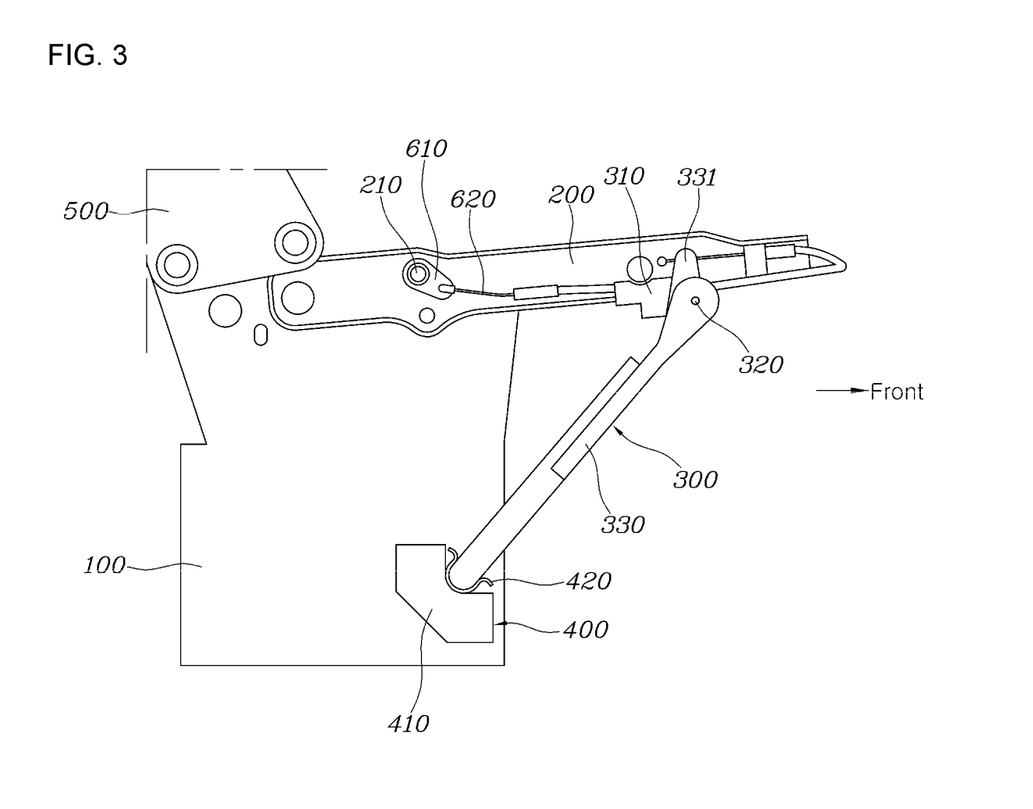
FIGS. 3 to 8 are views showing a structure of the seat of the present disclosure based on the state in FIG. 2.
Figure 4:
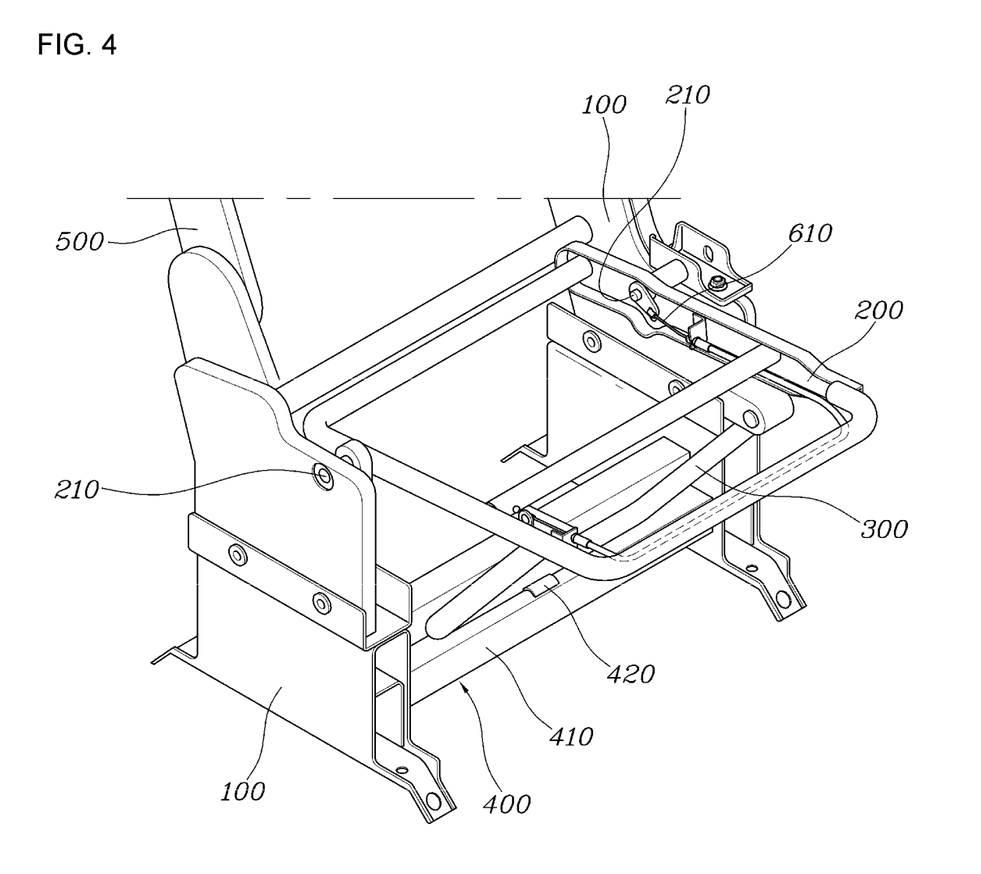
Figure 5:
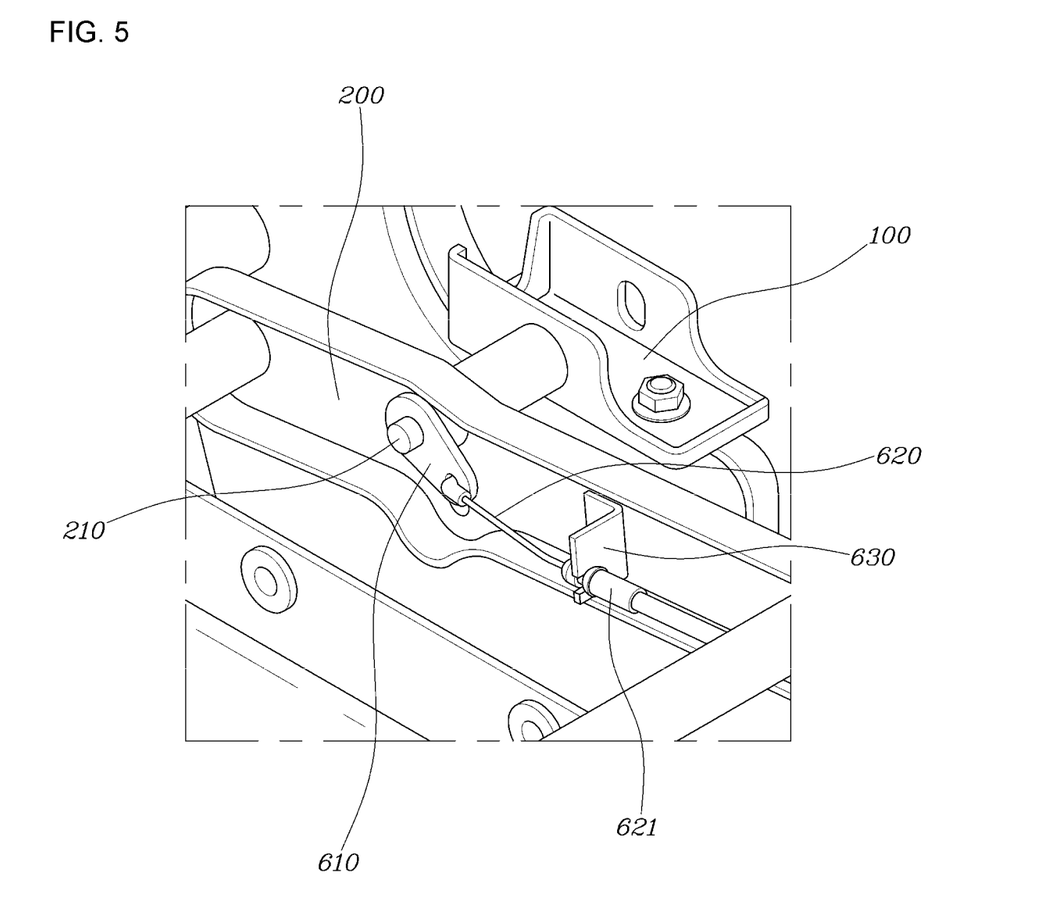
Figure 6:
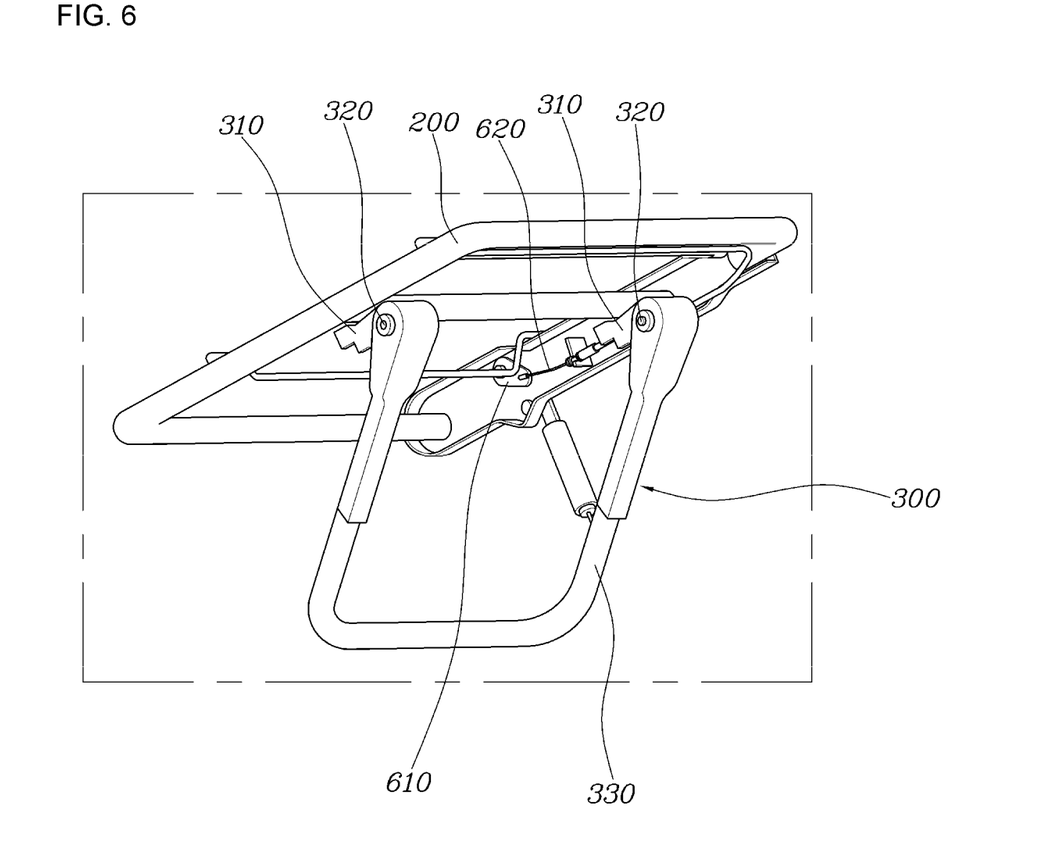
Figure 7:
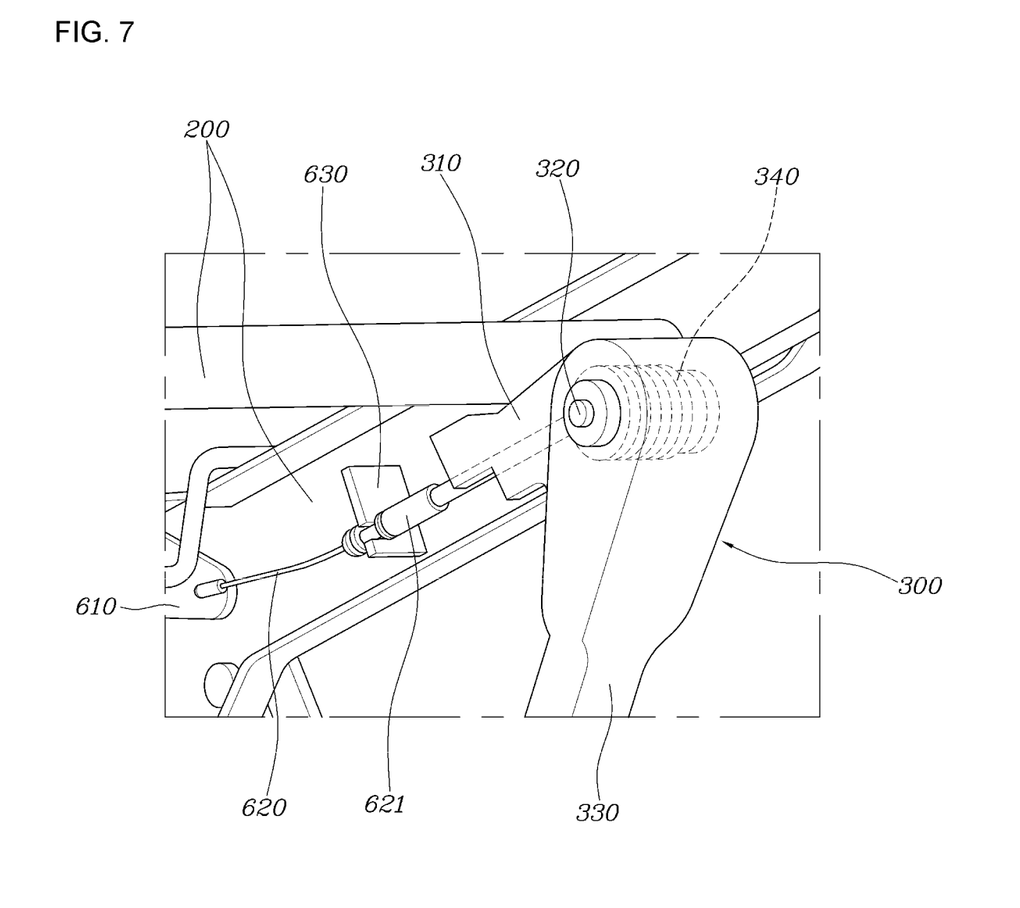
Figure 8:
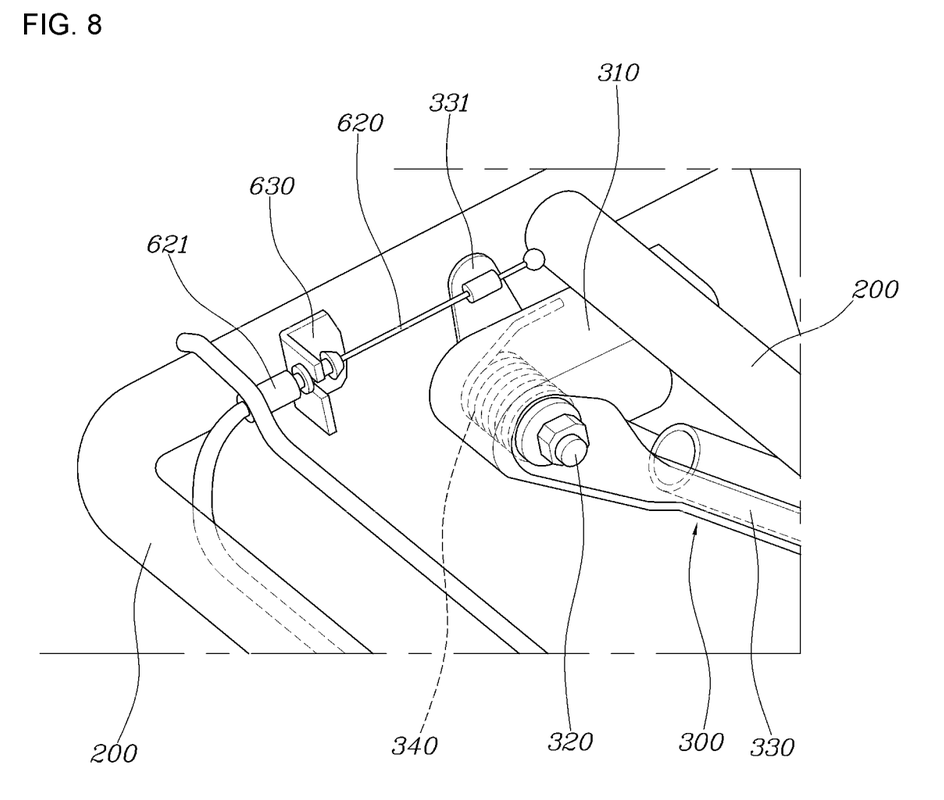
Figure 9:
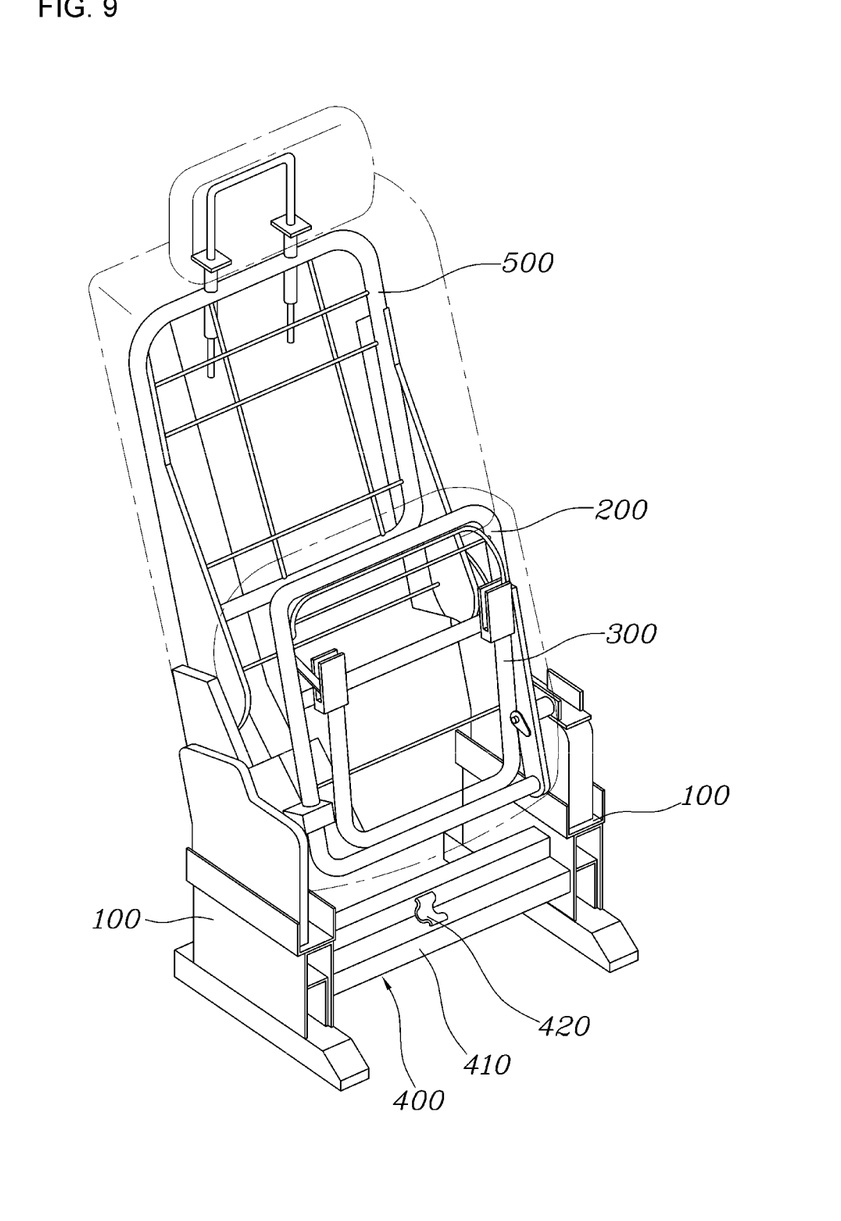
FIGS. 9 to 10 are views showing a cushion is rotated upward and stood upward according to the present disclosure.
Figure 10:
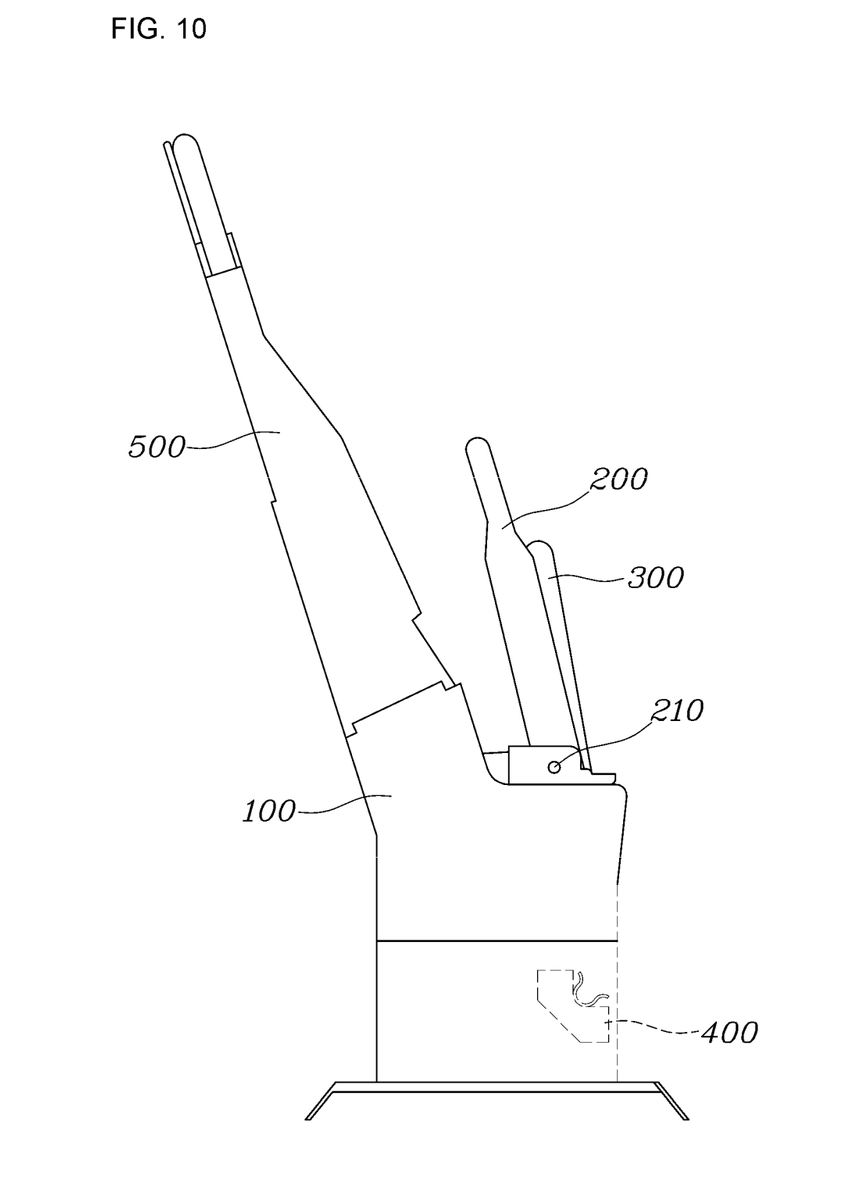

When the user grabs a front portion of the cushion 200 and lifts the cushion 200 up while the leg part 330 of the cushion leg 300 is fitted into the support spring 420, the cushion 200 may be rotated on the cushion shafts 210, and at this time, the leg part 330 may be released and separated from the support spring 420, and the cushion 200 may be rotated such that the front portion thereof faces the upper side, so that the cushion 200 is stood up as shown in FIGS. 9 and 10.

Figure 11:
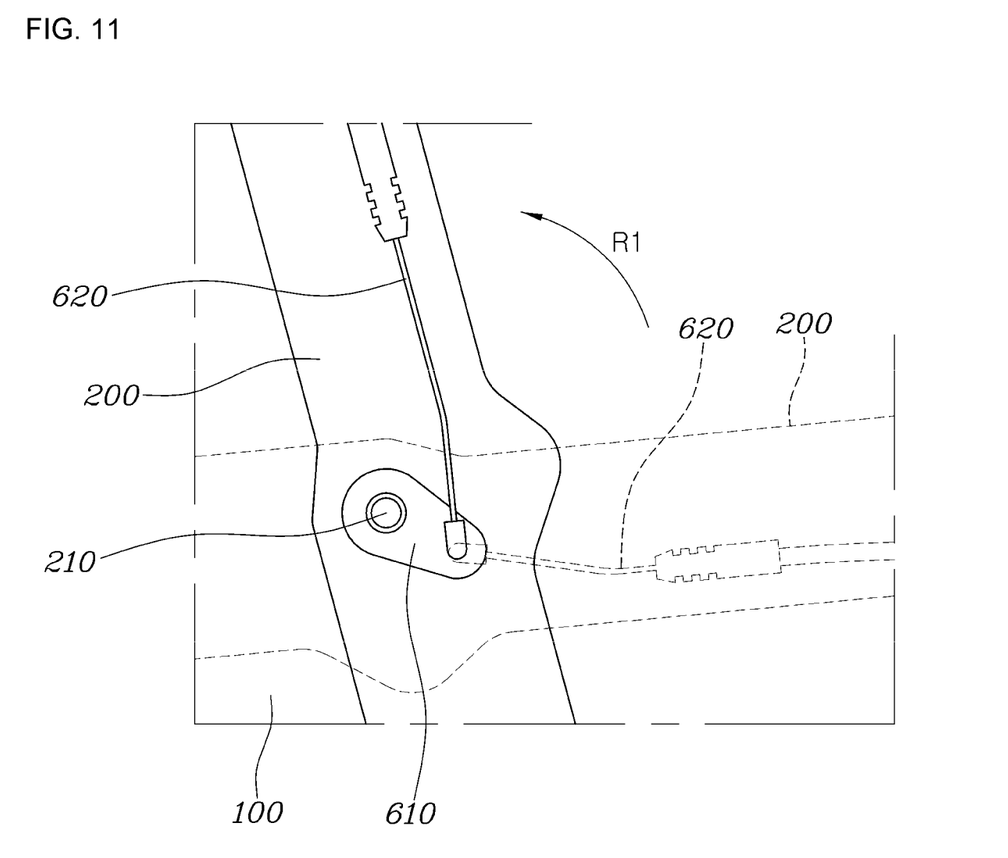
FIG. 11 is a view showing change of a leg cable in response to rotation of the cushion.

In FIG. 11, the cushion 200 and the leg cable 620 marked with dotted lines may be in the state in which the cushion 200 protrudes forward before being rotated, and the cushion 200 and the leg cable 620 marked with closed lines may be in the state in which the cushion 200 is rotated upward and stood up.

When the cushion 200 is turned from the forward protruding state (dotted line) to the upward rotated (arrow RI) and stood state (closed line), the leg cable 620 may be pulled, and the leg part 330 of the cushion leg 300 may be rotated by pulling the leg cable 620 and then may be folded to be in close contact with the cushion 200, and at this time, the leg springs 340 may be compressed.

Then, when the user rotates, downward, the cushion 200 in the upward rotated and stood state, the pulled leg cable 620 may be relaxed and the compressed leg springs 340 may be restored. At this time, the leg part 330 of the cushion leg 300 is rotated to protrude downward from the cushion 200 by the spring force of the leg springs 340, and as the user inserts and fastens the lower end of the leg part 330 protruding downward from the cushion 200 into the support spring 420, the cushion 200 is supported using the cushion leg 300.

According to the present disclosure, the seat for a vehicle with a cushion tip-up and down function may be characterized in that the cushion 200 is rotatably coupled to the seat base 100, the cushion leg 300 is rotatably coupled to the cushion 200, and when the cushion 200 protrudes forward the lower end of the cushion leg 300 is fitted into and held by the support spring 420 provided in the seat base 100 below the cushion 200.

In addition, the seat of according to the present disclosure may be characterized in that when the cushion 200 forward protruding is rotated upward, the lower end of the cushion leg 300 is released from the support spring 420, and the cushion leg 300 is automatically rotated to be in close contact with the vertically stood cushion 200 as the leg cable 620 connected to the cushion leg 300 is pulled, thereby maintaining the folded state of the seat.

Furthermore, the seat according to the present disclosure may be characterized in that when the cushion 200 vertically stood is rotated downward, the cushion leg 300 is automatically rotated by the recovery force of the leg springs 340 connected to the cushion leg 300 to protrude downward from the cushion 200, and the lower end of the cushion leg 300 is fitted into and held by the support spring 420, the cushion 200 is supported by the cushion leg 300.

As described above, according to the present disclosure, the seat for a vehicle with a cushion tip-up and down function may have the structure in which the cushion leg 300 rotatably coupled to the cushion 200 is fitted into and held by the support spring 420 of the support structure 400 provided in the seat base 100. Accordingly, as it is possible to provide the seat rail 10 at a portion of the vehicle body below, the forward and rearward movements of the seat using the seat rail 10 may be possible, thereby improving convenience.

Furthermore, according to the present disclosure, the seat for a vehicle with a cushion tip-up and down function may have the structure in which the cushion leg 300 is automatically rotated to be folded and protrude as the cushion 200 is rotated. Accordingly, as user action for rotating the cushion leg 300 is no longer required, it may be possible to improve the use convenience.

Although the preferred embodiment of the present disclosure has been disclosed in detail only with respect to the above specific embodiments, those skilled in the art will appreciate that various modifications, additions, and substitutions are possible, without departing from the spirit and scope of the present disclosure, and it is appropriate that the various modifications, additions, and substitutions belong to the accompanying claims.

What is claimed is:

1. A seat for a vehicle with a cushion tip-up and down function, the seat comprising:
   a seat base;
   a cushion coupled to the seat base to be rotatable upward and downward;
   a cushion leg rotatably coupled to the cushion;
   a support structure provided in the seat base and, in a state in which the cushion protrudes forward, the support structure supporting the cushion leg fitted into the support structure;
   where left and right portions of the cushion are coupled to the seat base such that the cushion is rotatable about a cushion shaft fixed on the seat base,
   a cable bracket securely fixed to the cushion shaft connecting the seat base to the cushion, and
   a leg cable having a first end connected to the cable bracket and a second end connected to the cushion leg and, when the cushion is rotated upward on the cushion shaft, the leg cable pulls the cable leg so as to rotate the cushion leg:
   where a position of the cable bracket connecting the first end of the leg cable is located relatively further foward or downward from a position of the cushion shaft.

2. The seat of claim 1, wherein the seat base is coupled to a seat rail and is configured to be movable forward and rearward along the seat rail.

3. The seat of claim 1, wherein the seat base is provided to be divided into left and right parts.

4. The seat of claim 1, wherein the cushion leg comprises:
   fixation parts securely coupled to left and right portions of the cushion, respectively; and
   a leg part of which opposite ends are rotatably coupled to the fixation parts by leg shafts as a medium and an intermediate part is fitted into the support structure.

5. The seat of claim 4, wherein the cushion leg further comprises:
   leg springs provided at the leg shafts, respectively, and each of which opposite ends are supported by each of the fixation parts and the leg part, and configured to supply an elastic force to the leg part so that the leg part is rotated forward on the leg shafts.

6. A vehicle comprising the seat of claim 1.

7. The seat of claim 1, wherein a protrusion protrudes from on the one end of the leg part, and he second end of the leg cable is securely coupled to the protrusion of the leg part.

8. The seat of claim 1, wherein the leg cable is wrapped by an outer cover.

9. The seat of claim 7, wherein the outer cover is fitted into a fixation bracket welded to the cushion.

10. The seat of claim 1, wherein the cable bracket is coupled to any one of two cushion shafts connecting the seat base to the cushion; and
   the second end of the leg cable is connected to one end among the opposite ends of the leg part, the one end being located relatively far from the cable bracket.

11. The seat of claim 1, wherein the support structure comprises:
   a support bracket located below the cushion and connecting the left and right parts of the seat base to each other; and
   a support spring fixed to the support bracket and into which a lower portion of the cushion leg is fitted and held.

12. The seat of claim 11, wherein the support spring has an arc-shaped section.

13. The seat of claim 11, wherein the support spring is a plate spring into which the circular cushion leg is inserted and is held by a spring force.

14. The seat of claim 11, wherein in a state in which the cushion protrudes forward, a lower end of the cushion leg is held by the support spring in a fitted manner, and thus the cushion leg supports the cushion.

15. The seat of claim 14, wherein when a user lifts the cushion while the cushion leg is fitted into the support spring, as the cushion leg is separated from the support spring, the cushion is rotated upward and stood up;
   when the cushion is rotated upward, the leg cable is pulled; and as the leg cable is pulled, the cushion leg is rotated to be folded in close contact with the cushion, and the leg springs are compressed.

16. The seat of claim 15, wherein when the user rotates the stood cushion downward, the pulled leg cable is relaxed, and thus the compressed leg springs are restored; and the cushion leg is rotated to protrude downward from the cushion by the spring force of the leg springs and then the lower end of the cushion leg is held by the support spring in the fitted manner.

17. A seat for a vehicle with a cushion tip-up and down function, the seat comprising:
a cushion rotatably coupled to a seat base;
a cushion leg rotatably coupled to the cushion, wherein, when the cushion protrudes forward, a lower end of the cushion leg is held by a support spring provided in the seat base in a fitted manner below the cushion;
wherein left and right portions of the cushion are coupled to the seat base such that the cushion is rotatable about a cushion shaft fixed on the seat base;
a cable bracket securely fixed to the cushion shaft connecting the seat base to the cushion; and
a leg cable having a first end connected to the cable bracket and a second end connected to the cushion leg and, when the cushion is rotated upward on the cushion shaft, the leg cable pulls the cable leg so as to rotate the cushion leg;
wherein a position of the cable bracket connecting the first end of the leg cable is located relatively further forward or downward from a position of the cushion shaft.

18. The seat of claim 17, wherein when the cushion protruding forward is rotated upward, the lower end of the cushion leg is separated from the support spring; and
as a leg cable connected to the cushion leg is pulled, the cushion leg is automatically rotated to be in close contact with the cushion stood vertically, thereby maintaining a folded state.

19. The seat of claim 18, wherein when the vertically stood cushion is rotated downward, the cushion leg is automatically rotated by a recovery force of the leg springs connected to the cushion leg to protrude downward from the cushion, and as the lower end of the cushion leg is held by the support spring in the fitted manner, the cushion is supported by the cushion leg.

* * * * *